US012668214B2

(12) United States Patent
Nakashima

(10) Patent No.: US 12,668,214 B2
(45) Date of Patent: Jun. 30, 2026

(54) VEHICLE

(71) Applicant: KAWASAKI MOTORS, LTD., Akashi (JP)

(72) Inventor: Yusuke Nakashima, Akashi (JP)

(73) Assignee: KAWASAKI MOTORS, LTD., Akashi (JP)

( * ) Notice: Subject to any disclaimer, the term of this patent is extended or adjusted under 35 U.S.C. 154(b) by 0 days.

(21) Appl. No.: 18/909,963

(22) Filed: Oct. 9, 2024

(65) Prior Publication Data

US 2026/0097745 A1 Apr. 9, 2026

(51) Int. Cl.
  B60T 7/04 (2006.01)
  G05G 1/30 (2008.04)

(52) U.S. Cl.
  CPC .............. B60T 7/045 (2013.01); G05G 1/305 (2013.01); B60Y 2200/23 (2013.01)

(58) Field of Classification Search
  CPC .................................. B60T 7/045; G05G 1/36
  See application file for complete search history.

(56) References Cited

U.S. PATENT DOCUMENTS

| | | | | |
|---|---|---|---|---|
| 1,532,870 A | * | 4/1925 | Blackburn | B60T 7/045 |
| | | | | 74/539 |
| 2,130,892 A | * | 9/1938 | Morphet | B60T 7/122 |
| | | | | 192/114 R |

| | | | | |
|---|---|---|---|---|
| 3,513,953 A | * | 5/1970 | Stevens | B60T 7/045 |
| | | | | 74/541 |
| 4,278,143 A | * | 7/1981 | Nagai | B60T 7/045 |
| | | | | 188/111 |
| 4,433,763 A | * | 2/1984 | Lizzio | B60T 7/045 |
| | | | | 192/219.7 |
| 2002/0178859 A1 | * | 12/2002 | Porter | G05G 1/305 |
| | | | | 74/512 |
| 2006/0230869 A1 | | 10/2006 | Cosby et al. | |
| 2007/0138863 A1 | * | 6/2007 | Clark | G05G 5/18 |
| | | | | 303/125 |
| 2008/0229868 A1 | * | 9/2008 | Populaire | B60T 7/045 |
| | | | | 74/512 |

FOREIGN PATENT DOCUMENTS

EP 890491 A2 * 1/1999

* cited by examiner

*Primary Examiner* — Daniel D Yabut
(74) *Attorney, Agent, or Firm* — XSENSUS LLP

(57) ABSTRACT

A vehicle includes: an accelerator pedal 3 rotatably supported by a vehicle body 1; a brake pedal 4 located at left of the accelerator pedal 3 and rotatably supported by the vehicle body 1; and a lock 7 that restrains the brake pedal 4 in a state where the brake pedal 4 is rotated to a parking position. The lock 7 is coupled to the accelerator pedal 3 through a link 2, and when the accelerator pedal 3 rotates from an initial position, releases restraint of the brake pedal 4 at the parking position by the link 2 in conjunction with rotation of the accelerator pedal 3. The link 2 extends from left of the accelerator pedal 3 toward the lock 7 and moves in the front-rear directions in accordance with rotation of the accelerator pedal 3.

9 Claims, 14 Drawing Sheets

TOP–BOTTOM DIRECTION

FRONT–REAR DIRECTION

LEFT–RIGHT DIRECTION

TOP-
BOTTOM
DIRECTION

FRONT-REAR
DIRECTION

LEFT-RIGHT
DIRECTION

TOP-
BOTTOM
DIRECTION

FRONT-REAR
DIRECTION

LEFT-RIGHT
DIRECTION

FRONT-REAR DIRECTION

LEFT-RIGHT DIRECTION

FRONT ← → REAR

LEFT ↕ RIGHT

VEHICLE

FIELD

The technique disclosed here relates to a vehicle.

BACKGROUND

U.S. Patent Application Publication No. 2006/0230869 discloses a modular pedal assembly including an accelerator pedal and a brake pedal. The brake pedal includes a service brake pedal and a parking brake pedal. The parking brake pedal rotates between an initial position and a second position about a predetermined rotation axis. The parking brake pedal is locked to a vehicle body at the second position while the vehicle is in a parked state. The accelerator pedal is coupled to the parking brake pedal and unlocks the parking brake pedal.

SUMMARY

In some cases, the accelerator pedal and the brake pedal are not integrally designed as one assembly, and are designed as different assemblies. In such cases, a load applied when the accelerator pedal is depressed to unlock the parking brake pedal might be insufficiently transferred to the parking brake pedal.

It is therefore an object of the technique disclosed here to enhance load transfer efficiency from an accelerator pedal to a brake pedal.

A vehicle disclosed here includes: an accelerator pedal rotatably supported by a vehicle body; a brake pedal located at left of the accelerator pedal and rotatably supported by the vehicle body; and a lock that restrains the brake pedal in a state where the brake pedal is rotated to a parking position, wherein the lock is coupled to the accelerator pedal through a link, and when the accelerator pedal rotates from an initial position, releases restraint of the brake pedal at the parking position by the link in conjunction with rotation of the accelerator pedal, and the link extends from left of the accelerator pedal toward the lock and moves in front-rear directions in accordance with rotation of the accelerator pedal.

A vehicle in another aspect disclosed here includes: an accelerator pedal rotatably supported by a vehicle body; a brake pedal located at left of the accelerator pedal and rotatably supported by the vehicle body; and a rotation lever rotatably supported by the vehicle body, wherein the rotation lever is coupled to the accelerator pedal to be movable relative to the accelerator pedal.

The vehicle can enhance load transfer efficiency from the accelerator pedal to the brake pedal.

DESCRIPTION OF EMBODIMENTS

An exemplary embodiment will be described in detail hereinafter with reference to the drawings.

Figure 1:
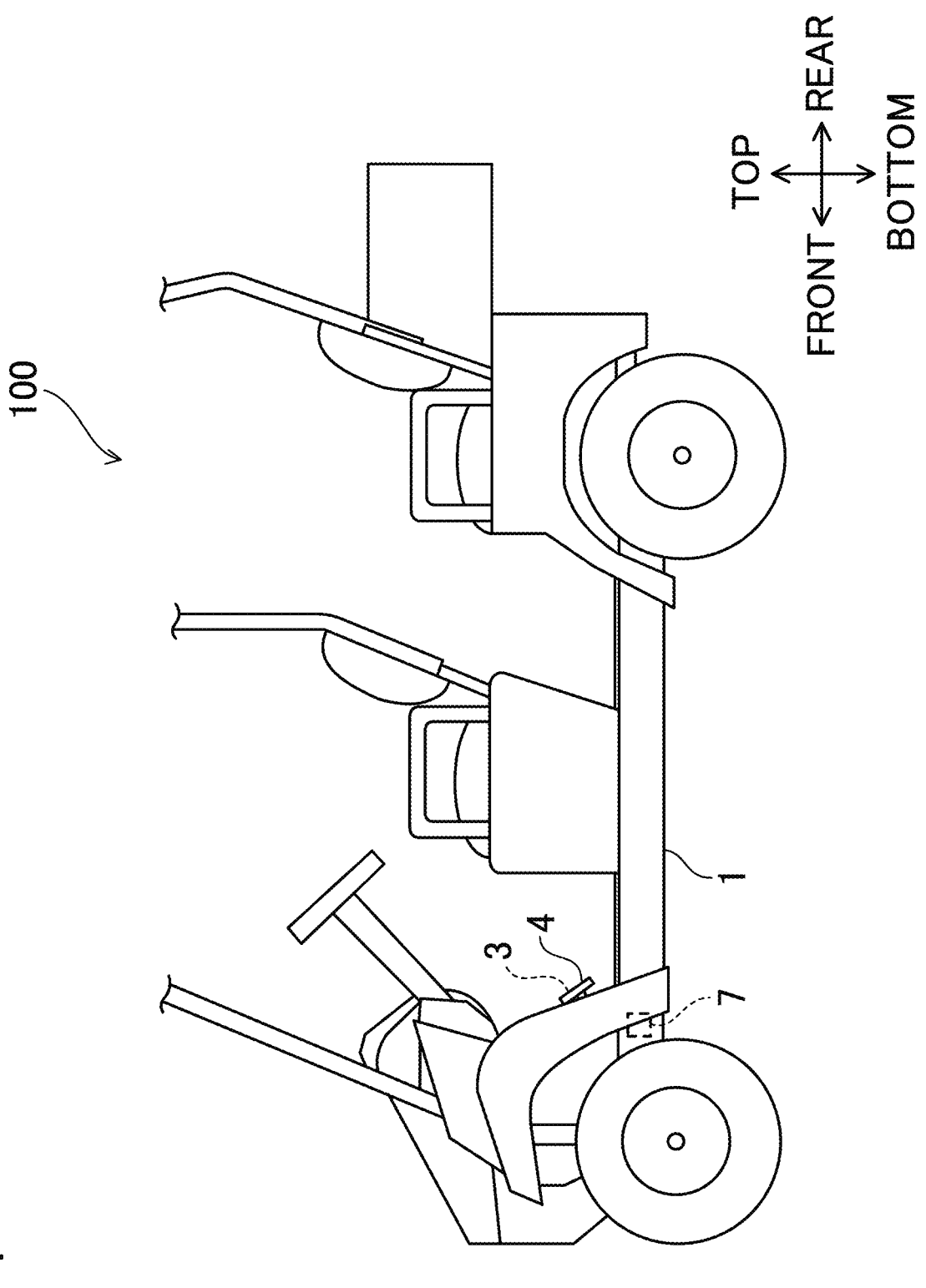
FIG. 1 is a side view of a utility vehicle.

FIG. 1 is a side view of a utility vehicle 100. Hereinafter, the utility vehicle 100 will also be referred to simply as a "vehicle 100." The vehicle 100 is an example of a vehicle. The vehicle 100 is a vehicle intended to travel at low speed in a limited area. Examples of the limited area include a limited community area, a private road, and a private property (e.g., a golf course, a park, etc.). The limited community area refers to an area available for use by local residents. The community area is, for example, an area including houses and public facilities (e.g., schools, hospitals, etc.), and is an area where the vehicle 100 not intended to travel on a public road is permitted to travel at low speed. The low speed refers to a speed up 20 mph to 30 mph, for example. The vehicle 100 may travel at a speed of 20 mph or less or 30 mph or more. The vehicle 100 includes, for example, a personal transport vehicle (PTV). The PTV includes a golf cart. The vehicle 100 may be other golf carts such as a low speed vehicle (LSV).

In this disclosure, components of the vehicle 100 will be described based on directions of the vehicle 100. Specifically, "front" refers to the front of the vehicle 100 in the vehicle front-rear directions, and "rear" refers to the rear of the vehicle 100 in the vehicle front-rear directions. "Left" refers to the left of the vehicle 100 when seeing forward, and "right" refers to the right of the vehicle 100 when seeing forward. The "vehicle width directions" refer to the vehicle width directions of the vehicle 100, in other words, means the left-right directions of the vehicle 100 and will be sometimes referred to as "left-right directions." An "inner side in the vehicle width directions" refers to a cabin side in the vehicle width directions, and an "outer side in the vehicle width directions" refers to a vehicle outer side in the vehicle width directions. The expression "a member extends or expands in a direction" herein includes not only a case where the member extends or expands strictly in parallel with the direction "but also a case where the member extends or expands generally in the direction."

Figure 2:
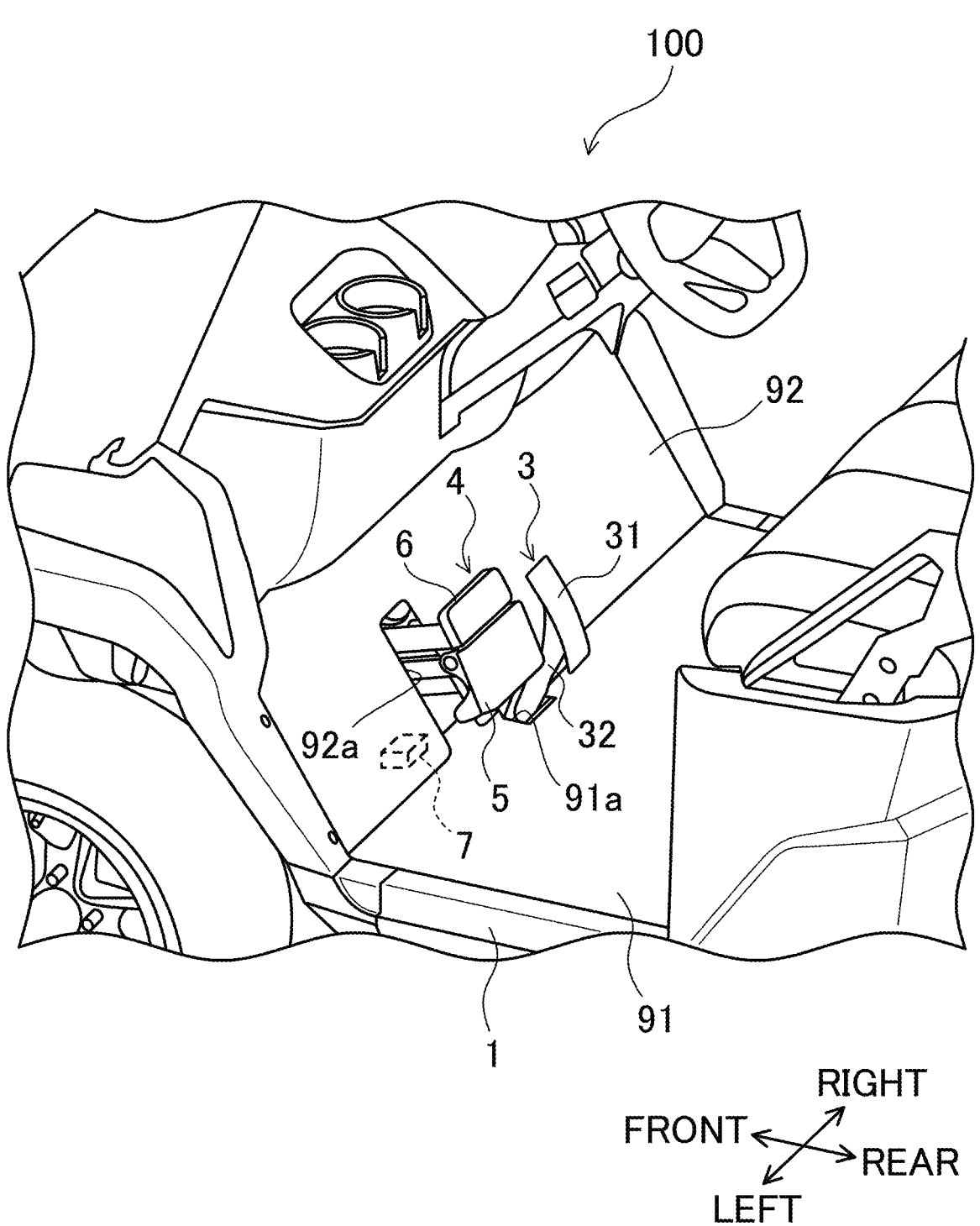
FIG. 2 is a perspective view of a front portion of a cabin when obliquely seen from above.

FIG. 2 is a perspective view of a front portion of a cabin when obliquely seen from above. The vehicle 100 includes an accelerator pedal 3, a brake pedal 4, and a lock 7. The vehicle 100 may further include a vehicle body 1, and a floor board 91 and a front board 92 attached to the vehicle body 1.

The accelerator pedal 3 is a pedal that is depressed when a driver accelerates the vehicle 100. The brake pedal 4 is a pedal that is depressed when the driver brakes the vehicle 100. The lock 7 locks the brake pedal 4 exerting a predetermined braking force. The predetermined braking force herein is a braking force necessary for maintaining a parked state of the vehicle 100. In the vehicle 100, the lock 7 is actuated in maintaining the parked state and locked with the brake pedal 4 depressed. That is, the vehicle 100 uses a braking force of the brake pedal 4 during parking. In the vehicle 100, when the accelerator pedal 3 is depressed with the brake pedal 4 locked, the lock 7 unlocks the brake pedal 4.

The floor board 91 defines a lower portion of the cabin. The floor board 91 expands in the front-rear directions and the vehicle width directions. The floor board 91 has a through hole 91a located at the front end. The accelerator pedal 3 is located in the through hole 91a. The front board 92 defines a lower portion of the front portion of the cabin. The front board 92 has a through hole 92a located at the lower end. The brake pedal 4 is located in the through hole 92a.

Figure 3:
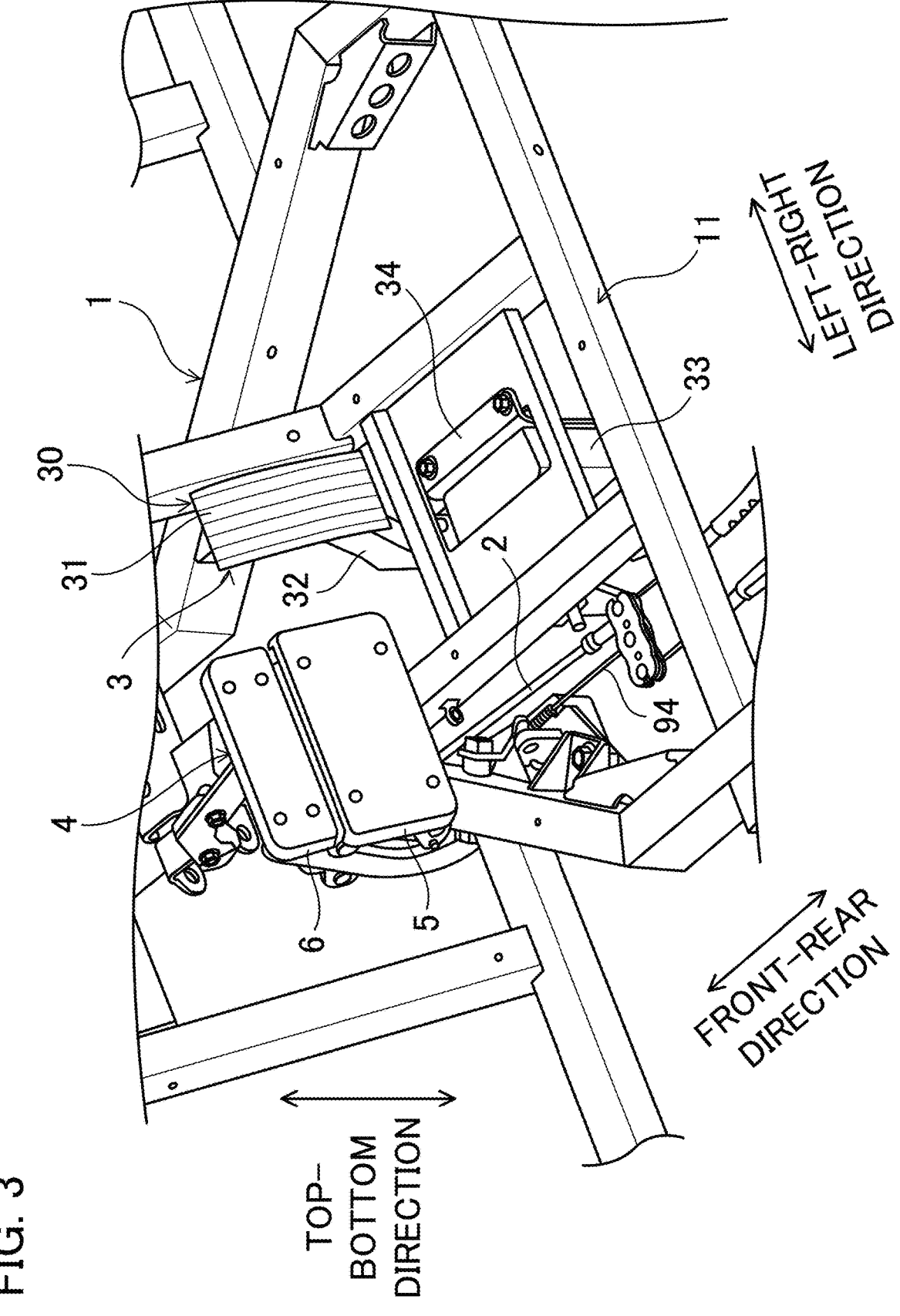
FIG. 3 is a perspective view of the front portion of the cabin from which a floor board and a front board are removed when obliquely seen from above.

FIG. 3 is a perspective view of the front portion of the cabin from which the floor board 91 and the front board 92 are removed when obliquely seen from above. The vehicle body 1 includes a body frame 11. The body frame 11 is a frame structure serving as a framework of a lower portion of the body of the vehicle 100. The body frame 11 is constituted by combining metal pipe parts, metal plate parts, or casted parts, for example. An accelerator pedal assembly 30 is attached to the body frame 11.

The accelerator pedal assembly 30 transfers the amount of depression of the accelerator pedal 3 by the driver to a controller of a power source. The power source is, for example, an engine or a motor. The controller may control the engine by adjusting the opening degree of a throttle valve of the engine by using a cable in accordance with the amount of depression of the accelerator pedal 3 by the driver. The accelerator pedal assembly 30 further includes a housing 33, a fixture 34, and a biasing member and a rotation angle sensor housed in the housing 33, in addition to the accelerator pedal 3.

Figure 4:
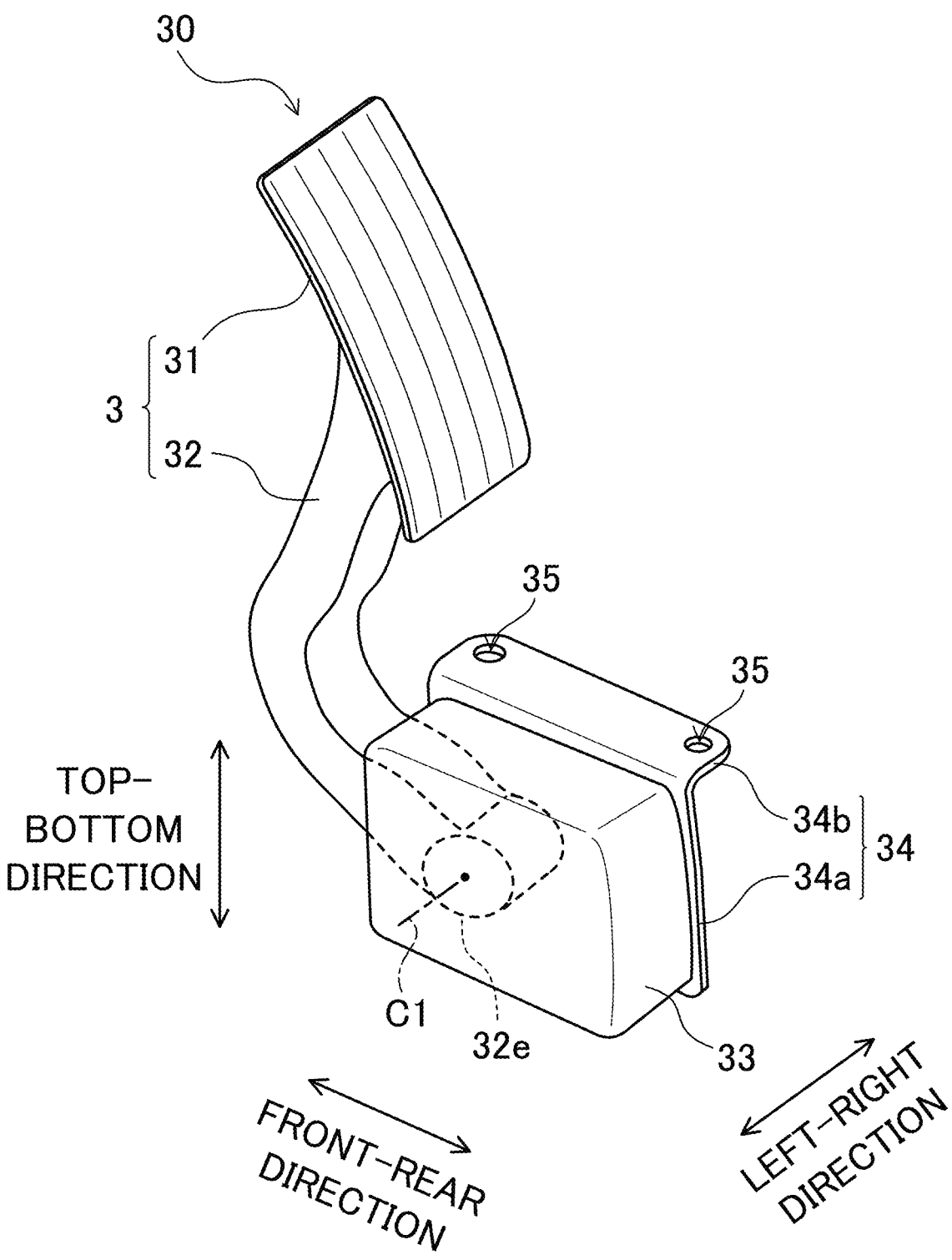
FIG. 4 is a perspective view of an accelerator pedal assembly when seen from obliquely above.

FIG. 4 is a perspective view of an accelerator pedal assembly 30 when seen from obliquely above. The accelerator pedal 3 is rotatably supported by the vehicle body 1, specifically the body frame 11 (see FIG. 3 for the vehicle body 1 and the body frame 11). In this example, the accelerator pedal 3 rotates about a predetermined first rotation axis C1. The first rotation axis C1 extends substantially in the vehicle width directions. Specifically, the accelerator pedal 3 rotates from a first initial position to a full throttle position. An unlocked position is located between the first initial position and the full throttle position. The first initial position is a rotation position of the accelerator pedal 3 in a state where the accelerator pedal 3 is not depressed by the driver. The first initial position is an example of an initial position. The unlocked position is a rotation position in releasing restraint of the brake pedal 4 by the lock 7. The full throttle position is a rotation position at which the accelerator pedal 3 is depressed to the maximum by the driver.

Specifically, the accelerator pedal 3 includes a pedal 31 and an arm 32. The pedal 31 is a part that contacts a foot of the driver when the driver accelerates the vehicle 100. The arm 32 transfers depression of the pedal 31 by the driver into the housing 33. The arm 32 extends downward from the pedal 31. Specifically, the arm 32 bends to project forward. The arm 32 rotates about the first rotation axis C1. The first rotation axis C1 passes through a lower end portion 32e of the arm 32.

The housing 33 supports the arm 32. The housing 33 has a box shape having an accommodation space therein. The housing 33 houses at least the lower end portion 32e of the arm 32.

The fixture 34 attaches the accelerator pedal 3 to the body frame 11 (see FIG. 3). Specifically, the fixture 34 attaches the accelerator pedal 3 to the body frame 11 through the housing 33. In this example, the fixture 34 has an L-shaped bracket. The fixture 34 includes a body 34a and a fixture piece 34b. The body 34a is attached to the housing 33. The body 34a has a plate shape expanding substantially in the front-rear directions and the top-bottom directions. The fixture piece 34b is attached to the body frame 11. The fixture piece 34b has a plate shape expanding substantially in the front-rear directions and the vehicle width directions. The left end of the fixture piece 34b is coupled to the upper end of the body 34a. The fixture piece 34b includes two through holes 35. A bolt is inserted in each of the through holes 35 and fastened to the body frame 11. In this manner, the accelerator pedal 3 is attached to the body frame 11.

The biasing member biases the accelerator pedal 3 from the full throttle position toward the first initial position when the driver stops depressing the accelerator pedal 3. The biasing member is, for example, a spring.

The rotation angle sensor detects a rotation angle of the accelerator pedal 3 and transfers the detected rotation angle to the controller of the power source.

As illustrated in FIG. 3, the brake pedal 4 is rotatably supported by the vehicle body 1, specifically the body frame 11. The brake pedal 4 rotates from a second initial position to a maximum rotation position. A parking position is located between the second initial position and the maximum rotation position. The second initial position is a rotation position of the brake pedal 4 in a state where the brake pedal 4 is not depressed by the driver. The parking position is a rotation position at which a brake system exhibits a predetermined braking force. The braking force increases in accordance with the amount of depression of the brake pedal 4. The parking position is set at a position at which the brake system exhibits a predetermined braking force. The maximum rotation position is a rotation position at which the brake pedal 4 is depressed to the maximum by the driver.

The brake pedal 4 is located at the left of the accelerator pedal 3. Specifically, the brake pedal 4 is located at the left of the accelerator pedal 3 with an interval from the accelerator pedal 3 in the vehicle width directions.

The brake pedal 4 includes a normal brake pedal 5 and a parking brake pedal 6. The normal brake pedal 5 is a pedal that is depressed in braking the vehicle 100, for example. The parking brake pedal 6 is a pedal that is operated in maintaining a parked state of the vehicle 100.

Figure 5:
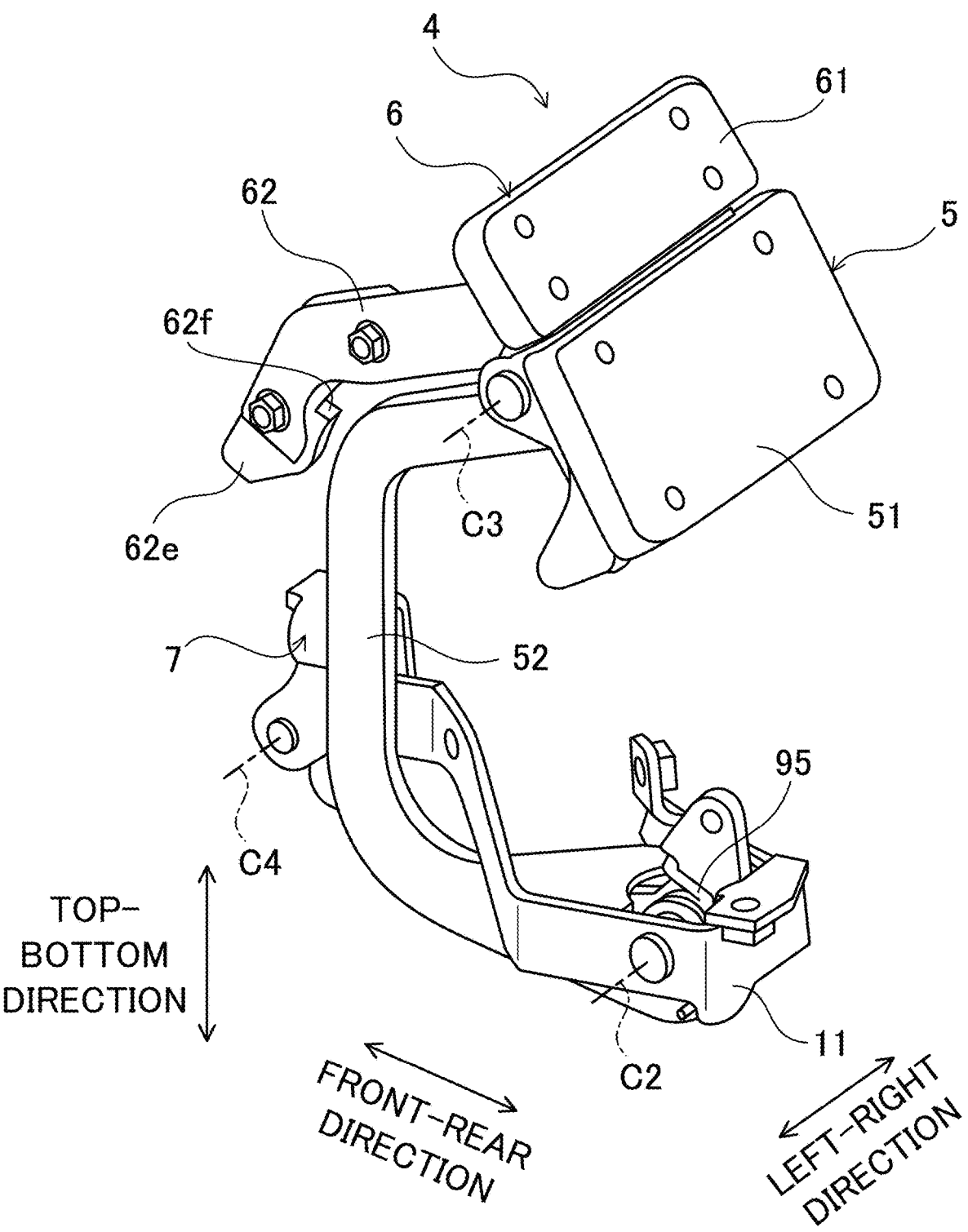
FIG. 5 is a perspective view of a brake pedal when seen from obliquely above.

FIG. 5 is a perspective view of the brake pedal 4 when seen from obliquely above. The normal brake pedal 5 includes a pedal 51 and an arm 52. The pedal 51 is a part that contacts a foot of the driver when the driver depresses the brake pedal 4. The arm 52 transfers depression of the pedal 51 by the driver to a coupling portion between the arm 52 and the vehicle body 1. The arm 52 extends downward from the pedal 51. Specifically, the arm 52 bends to project forward.

Figure 6:
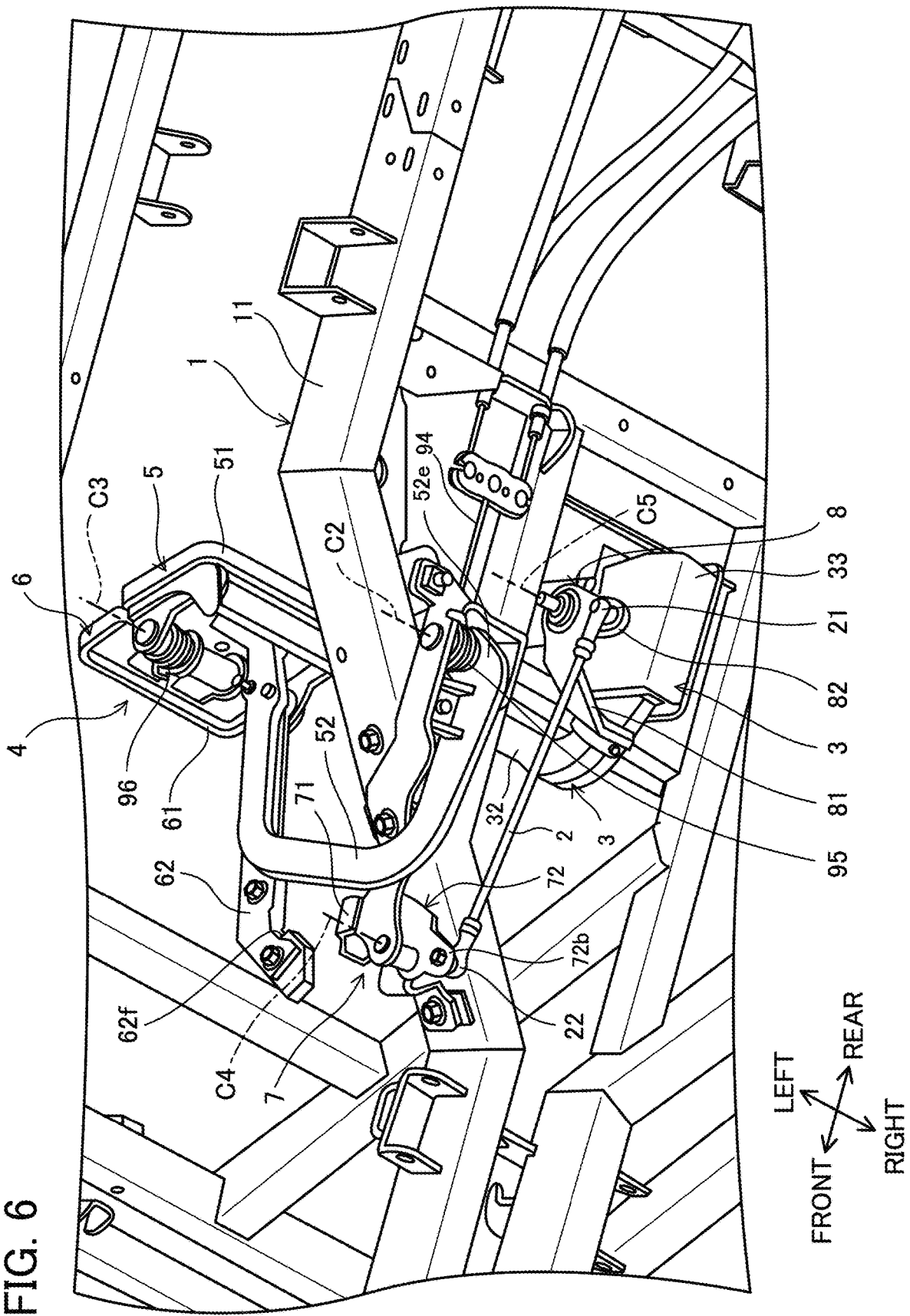
FIG. 6 is a perspective view of the front portion of the cabin from which the floor board and the front board are removed when obliquely seen from below.

FIG. 6 is a perspective view of the front portion of the cabin from which the floor board and the front board are removed when obliquely seen from below. The normal brake pedal 5 is attached to the body frame 11 to be rotatable about a predetermined second rotation axis C2. A rotation position of the normal brake pedal 5 is a rotation position of the brake pedal 4. That is, the normal brake pedal 5 rotates between the second initial position and the maximum rotation position. The second rotation axis C2 extends substantially in the vehicle width directions. The second rotation axis C2 passes through a lower end portion 52e of the arm 52. That is, the normal brake pedal 5 rotates about the lower end portion 52e of the arm 52.

In this example, a cable 94 extending substantially in the front-rear directions is attached to the lower end portion 52e of the arm 52. The cable 94 is coupled to the brake system. When the brake system detects forward movement of the cable 94, the brake system brakes the vehicle 100. When the arm 52 rotates about the second rotation axis C2, the cable 94 moves forward, and the brake system brakes the vehicle 100.

A first spring 95 that biases the normal brake pedal 5 from the maximum rotation position toward the second initial position is located at a coupling portion between the lower end portion 52e of the arm 52 and the body frame 11. In this example, the first spring 95 is a coil spring. The first spring 95 has a first end attached to the lower end portion 52e of the arm 52 and a second end attached to the body frame 11. Accordingly, when the driver stops depressing the pedal 51, the normal brake pedal 5 returns to the second initial position.

As illustrated in FIG. 5, the parking brake pedal 6 is coupled to the normal brake pedal 5 and rotates in conjunction with rotation of the normal brake pedal 5. Specifically, the parking brake pedal 6 is coupled to the normal brake pedal 5 to be rotatable about a predetermined third rotation axis C3. That is, the parking brake pedal 6 rotates together with the normal brake pedal 5 that rotates about the second rotation axis C2, and rotates relative to the normal brake pedal 5 about the third rotation axis C3. The third rotation axis C3 extends substantially in the vehicle width directions. In this example, the third rotation axis C3 is located forward of the upper end of the pedal 51 of the normal brake pedal 5. In regard to rotation of the parking brake pedal 6 about the third rotation axis C3, the parking brake pedal 6 rotates at least between a third initial position and a locked position. The third initial position is a rotation position of the parking brake pedal 6 in a state where the parking brake pedal 6 is not operated by the driver. The locked position is a rotation position at which the brake pedal 4 is locked.

Specifically, the parking brake pedal 6 include a pedal 61 and an arm 62. The pedal 61 is a part that contacts a foot of the driver when the driver depresses the parking brake pedal 6. The pedal 61 is located above the pedal 51 of the normal brake pedal 5 and adjacent to the pedal 51. The pedal 61 at the third initial position and the pedal 51 of the normal brake pedal 5 are located substantially on the same plane. The pedal 61 is coupled to the pedal 51 of the normal brake pedal

5 to be rotatable about the third rotation axis C3. The arm 62 is engaged with the lock 7 in fixing the brake pedal 4 in the state of exhibiting a predetermined braking force. The arm 62 extends obliquely downward from the pedal 61. The arm 62 rotates bout the third rotation axis C3 together with the pedal 61. The arm 62 has a hook 62f in a lower end portion thereof. In this example, the hook 62f projects rearward. The hook 62f is engaged with the lock 7 while the brake pedal 4 is at the parking position.

As illustrated in FIG. 6, a second spring 96 that biases the parking brake pedal 6 from the locked position toward the third initial position is located in a coupling portion between the pedal 61 of the parking brake pedal 6 and the pedal 51 of the normal brake pedal 5. In this example, the second spring 96 is a coil spring. The second spring 96 has a first end attached to the pedal 61 and a second end attached to the pedal 51. Accordingly, when an external force exerted on the pedal 61 is canceled, the parking brake pedal 6 returns to the third initial position.

The lock 7 restrains the brake pedal 4, specifically the normal brake pedal 5, in a state where the brake pedal 4 is rotated to the parking position. In addition, the lock 7 releases restraint of the normal brake pedal 5 at the parking position. That is, the lock 7 alternately switches between restraint of the normal brake pedal 5 and release of the restraint. The lock 7 includes a striker 71 and a release lever 72.

Figure 7:
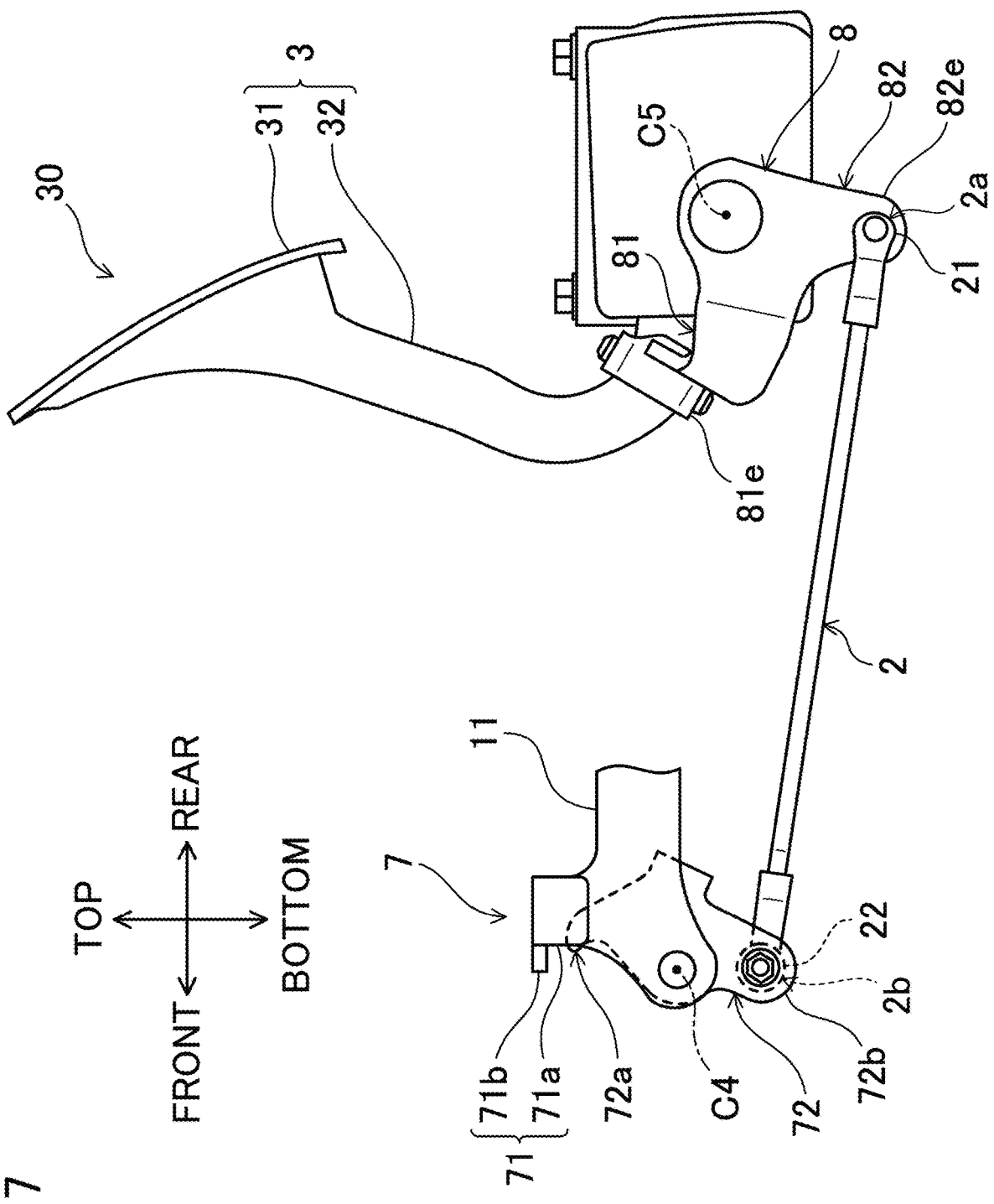
FIG. 7 is a side view of an accelerator pedal assembly, a lock, a link, and a rotation lever.

FIG. 7 is a side view of the accelerator pedal assembly 30, the lock 7, a link 2, and a rotation lever 8. The striker 71 can be engaged with the hook 62f of the arm 62 of the parking brake pedal 6 while the brake pedal 4 is at the parking position (see also FIG. 6). The striker 71 is attached to the body frame 11. Specifically, the striker 71 includes a striker body 71a and a projection piece 71b. The striker body 71a is attached to the body frame 11. The projection piece 71b projects forward from the front end of the striker body 71a. The projection piece 71b has a plate shape expanding substantially in the front-rear directions and the vehicle width directions. While the brake pedal 4 is at the parking position, when the pedal 61 of the parking brake pedal 6 rotates about the third rotation axis C3, the projection piece 71b is engaged with the hook 62f. Specifically, while the brake pedal 4 is at the parking position, the lower surface of the projection piece 71b contacts the hook 62f and the projection piece 71b is engaged with the hook 62f.

The release lever 72 releases engagement between the hook 62f and the striker 71. The release lever 72 is attached to the body frame 11 to be rotatable about a predetermined fourth rotation axis C4. The fourth rotation axis C4 extends substantially in the vehicle width directions. In this example, the fourth rotation axis C4 is located immediately under the striker 71. Specifically, the release lever 72 includes a first portion 72a that contacts the arm 62 (see FIG. 6) at the locked position during rotation, and a second portion 72b to which the link 2 described later is attached. With respect to the top-bottom directions, the first portion 72a is located between the striker 71 and the fourth rotation axis C4 and the second portion 72b is located below the fourth rotation axis C4. Here, a position in the top-bottom directions refers only to a position in the top-bottom directions, without considering positions in directions other than the top-bottom directions, that is, positions in the front-rear directions and the vehicle width directions. The same applies to positions in the vehicle width directions and positions in the front-rear directions.

The vehicle 100 further includes the rotation lever 8 and the link 2. The rotation lever 8 transfers a rotation motion of the accelerator pedal 3 to the link 2. The link 2 transfers a rotation motion of the accelerator pedal 3 to the lock 7, specifically, the release lever 72.

Figure 8:
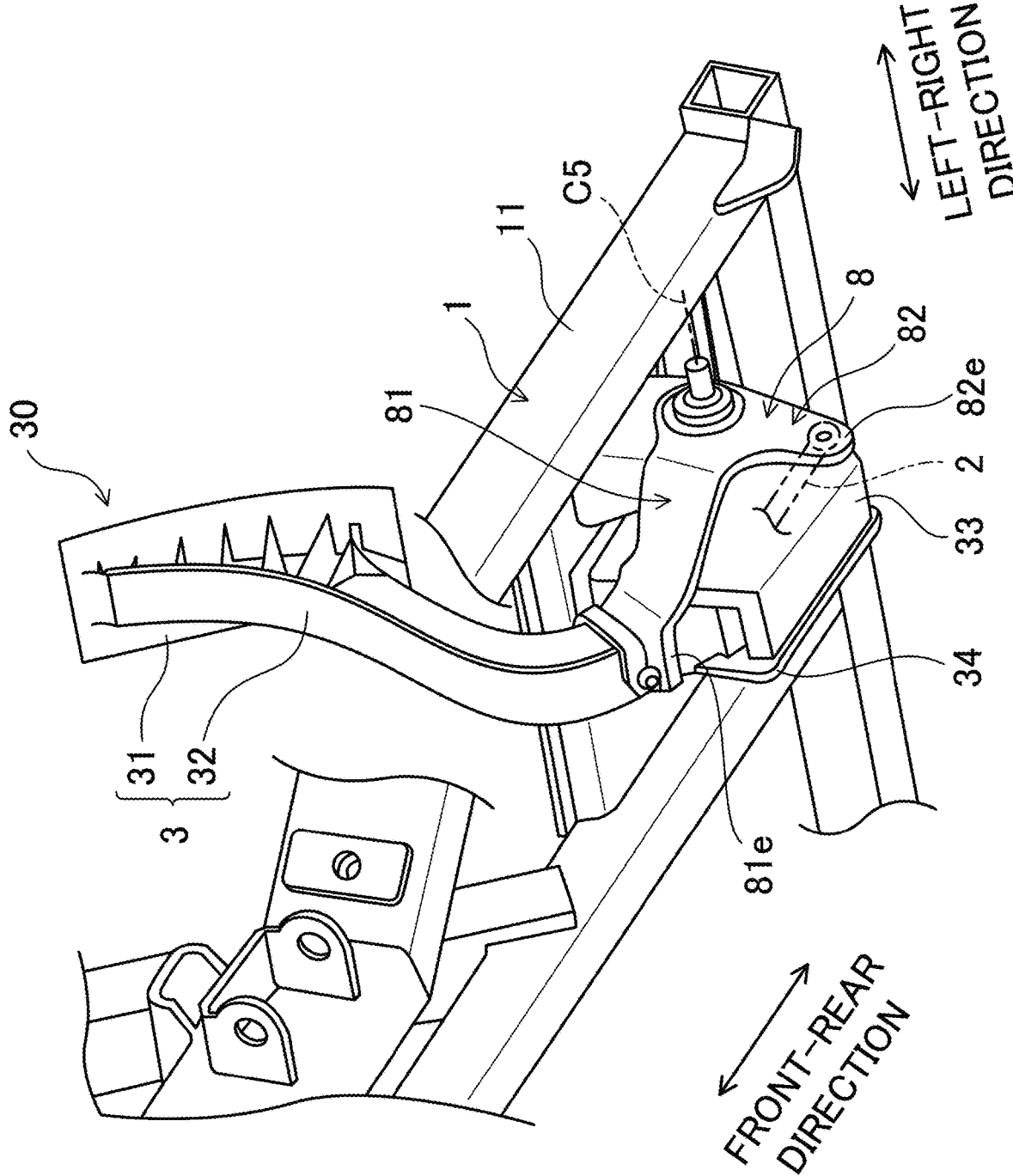
FIG. 8 is a perspective view of the accelerator pedal assembly attached to a vehicle body when obliquely seen from below.

FIG. 8 is a perspective view of the accelerator pedal assembly 30 to which the rotation lever 8 is attached when obliquely seen from below. In FIG. 8, the link 2 is indicated by chain double-dashed lines for convenience of description. The rotation lever 8 is rotatably supported by the vehicle body 1 and couples the accelerator pedal 3 and the link 2 to each other. Specifically, the rotation lever 8 is attached to the body frame 11 to be rotatable about a predetermined fifth rotation axis C5. The fifth rotation axis C5 extends substantially in the vehicle width directions. With respect to the top-bottom directions, the position of the fifth rotation axis C5 coincides or substantially coincides with the position of the first rotation axis C1 (see FIG. 4). With respect to the front-rear directions, the position of the fifth rotation axis C5 coincides or substantially coincides with the position of the first rotation axis C1. The rotation lever 8 is located at the left of the accelerator pedal 3.

The rotation lever 8 includes a first arm 81 attached to the arm 32 of the accelerator pedal 3, and a second arm 82 to which the link 2 is attached. The first arm 81 extends substantially right-forward from a position forward of the fifth rotation axis C5. An end portion 81*e* of the first arm 81 on the opposite side of the fifth rotation axis C5 is coupled to the arm 32. The second arm 82 extends substantially downward from a position below the fifth rotation axis C5. The end portion 82*e* of the second arm 82 on the opposite side of the fifth rotation axis C5 is attached to the link 2. In this configuration, the rotation lever 8 rotates about the fifth rotation axis C5 in conjunction with rotation of the arm 32 about the first rotation axis C1.

Figure 9:
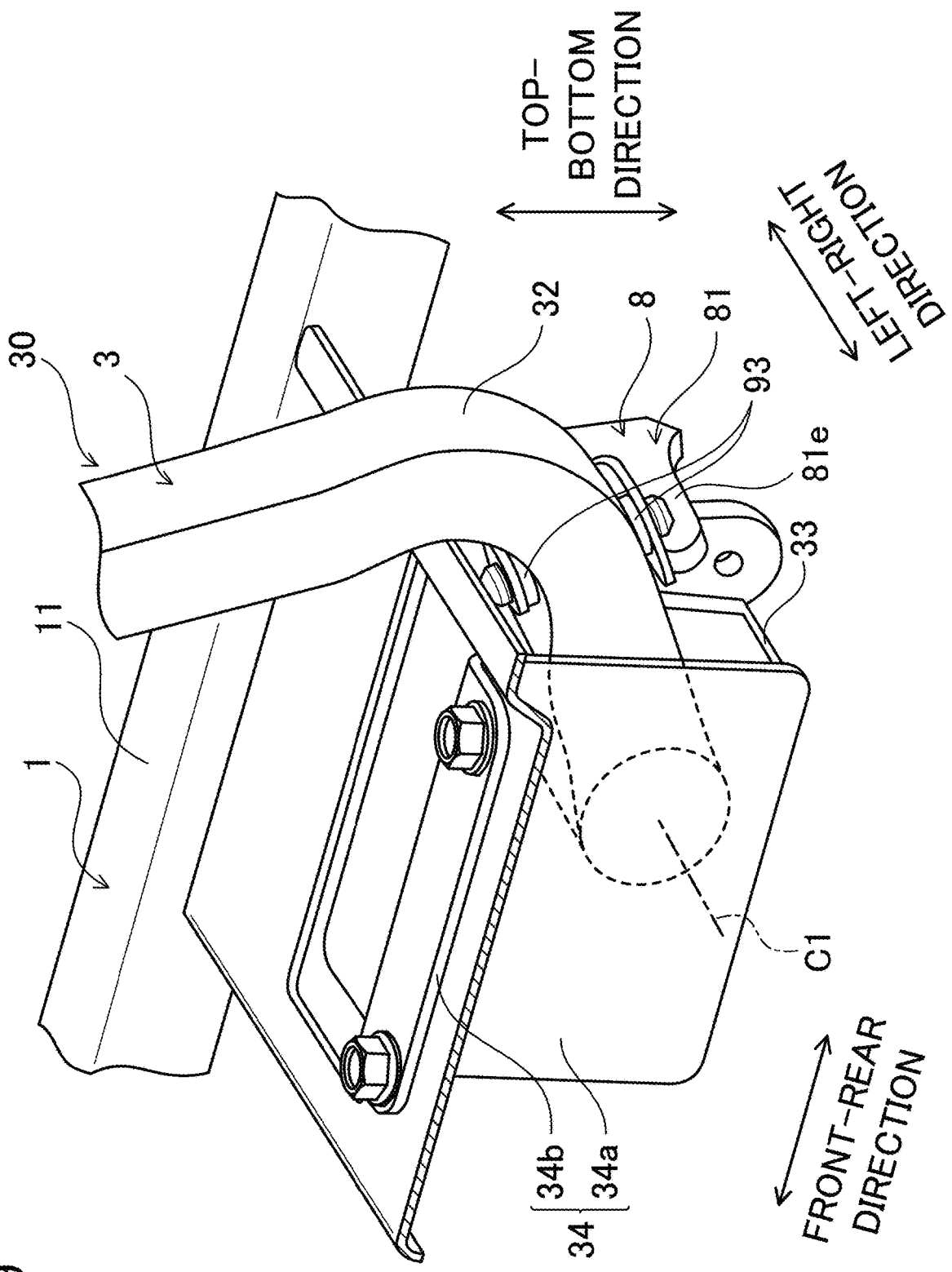
FIG. 9 is a perspective view of the accelerator pedal assembly attached to the vehicle body when obliquely seen from above.

FIG. 9 is a perspective view of the accelerator pedal assembly 30 attached to the body frame 11 when obliquely seen from above. The rotation lever 8 is coupled to the accelerator pedal 3 to be movable relative to the accelerator pedal 3. Specifically, the rotation lever 8 is coupled to the accelerator pedal 3 through an elastic member 93. The elastic member 93 is, for example, rubber. Specifically, the end portion 81*e* of the first arm 81 is branched into two parts and sandwiches the arm 32 to be thereby coupled to the arm 32. The elastic member 93 is located between the end portion 81*e* of the first arm 81 and the arm 32. The elastic member 93 is in contact with both the end portion 81*e* of the first arm 81 and the arm 32. Elasticity of the elastic member 93 allows the end portion 81*e* of the first arm 81 to be slightly slidable along the contact surface between the arm 32 and the elastic member 93 while being coupled to the arm 32. Elasticity of the elastic member 93 also allows the end portion 81*e* of the first arm 81 to be slightly slidable along a direction orthogonal to the contact surface while being attached to the arm 32. Accordingly, the rotation lever 8 is movable relative to the accelerator pedal 3.

As illustrated in FIG. 6, the link 2 couples the accelerator pedal 3 and the lock 7 to each other. Specifically, the link 2 couples the accelerator pedal 3 and the lock 7 to each other through the rotation lever 8. The link 2 is located between the accelerator pedal 3 and the brake pedal 4 with respect to the vehicle width directions.

Figure 10:
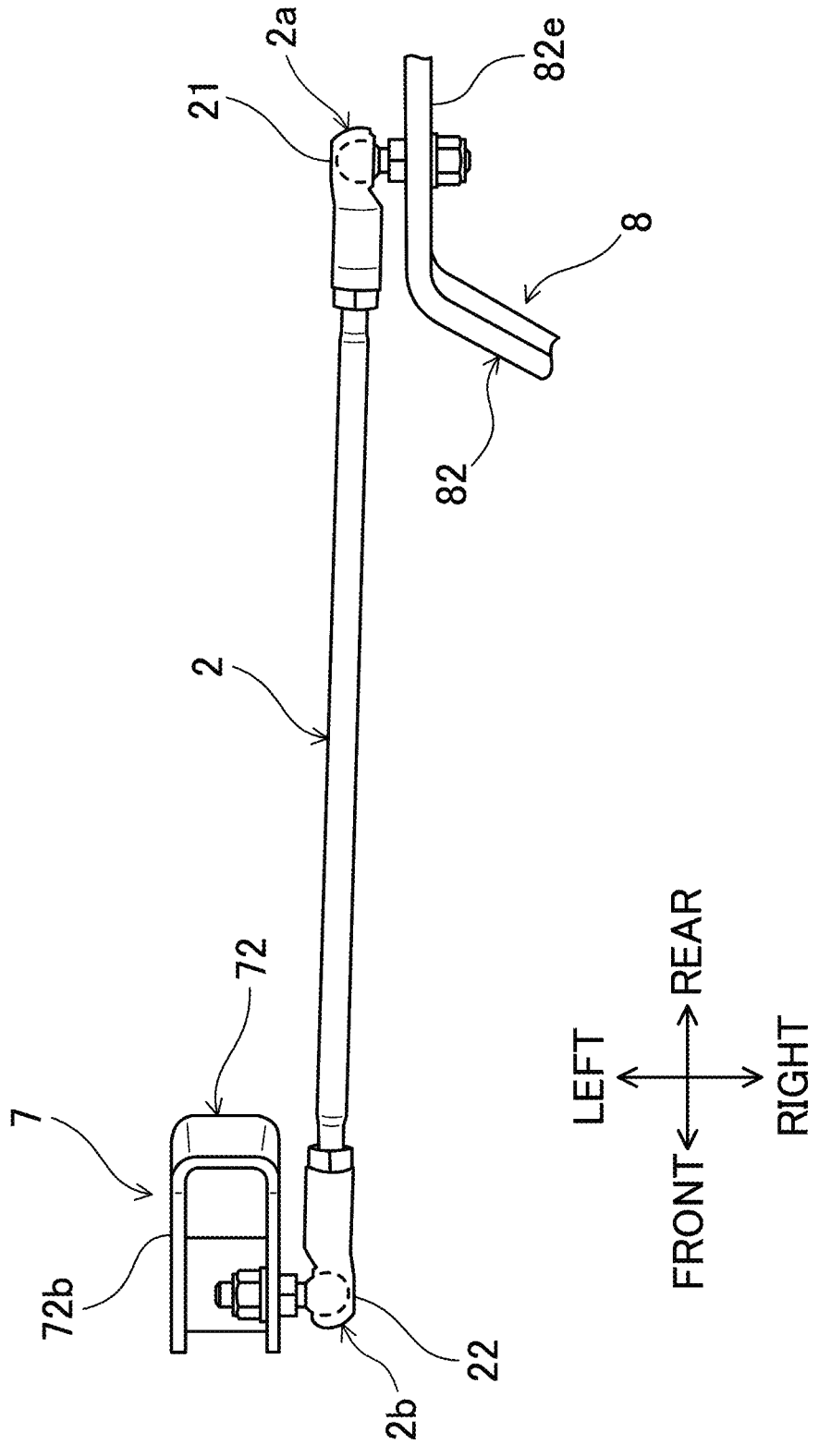
FIG. 10 is a bottom view of a link when seen from below.

The link 2 extends from the left of the accelerator pedal 3 toward the lock 7. In this example, as illustrated in FIG. 10, the link 2 extends linearly. FIG. 10 is a bottom view of the link 2 when seen from below. The link 2 extends substantially in the front-rear directions. In this example, the link 2 has a rod shape. The link 2 includes a first end 2*a* and a second end 2*b* in the length directions. With respect to the front-rear directions, the second end 2*b* is located forward of the first end 2*a*.

Specifically, the link 2 includes a first joint 21 located at the first end 2*a* and a second joint 22 located at the second end 2*b*. The first joint 21 is attached to the end portion 82*e* of the second arm 82 of the rotation lever 8. The second joint 22 is attached to the second portion 72*b* of the release lever 72. In this example, each of the first joint 21 and the second joint 22 is a ball joint. That is, the link 2 is coupled to each of the accelerator pedal 3 and the lock 7 through the ball joint. A portion of the link 2 between the first joint 21 and the second joint 22 extends linearly.

As illustrated in FIG. 7, in this example, the attachment position of the link 2 to the rotation lever 8 is located below the attachment position of the link 2 to the lock 7. That is, the height of the first joint 21 is lower than the height of the second joint 22.

As described above, the rotation lever 8 rotates about the fifth rotation axis C5 in conjunction with rotation of the accelerator pedal 3 about the first rotation axis C1. The release lever 72 of the lock 7 rotates about the fourth rotation axis C4. The link 2 couples the release lever 72 and the rotation lever 8 to each other. In this configuration, when the accelerator pedal 3 rotates about the first rotation axis C1, the rotation lever 8 rotates about the fifth rotation axis C5, and in conjunction with this rotation, the link 2 moves in the front-rear directions. That is, the link 2 moves forward and rearward in accordance with rotation of the accelerator pedal 3. The release lever 72 rotates about the fourth rotation axis C4 in conjunction with forward and rearward movement of the link 2.

Figure 11:
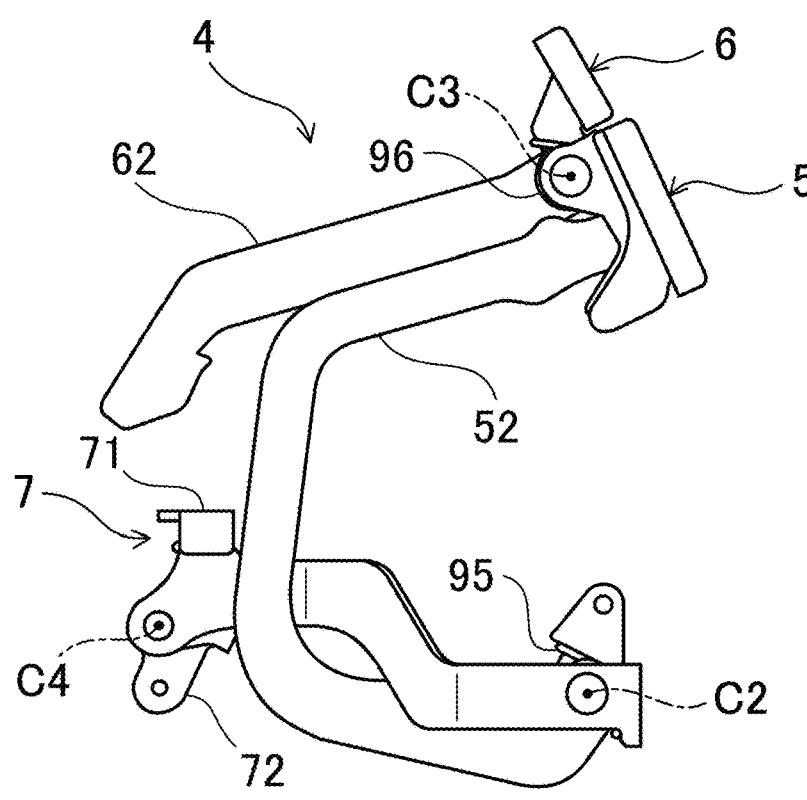
FIG. 11 is a side view of the brake pedal for describing restraint of the brake pedal by the lock.
Figure 12:
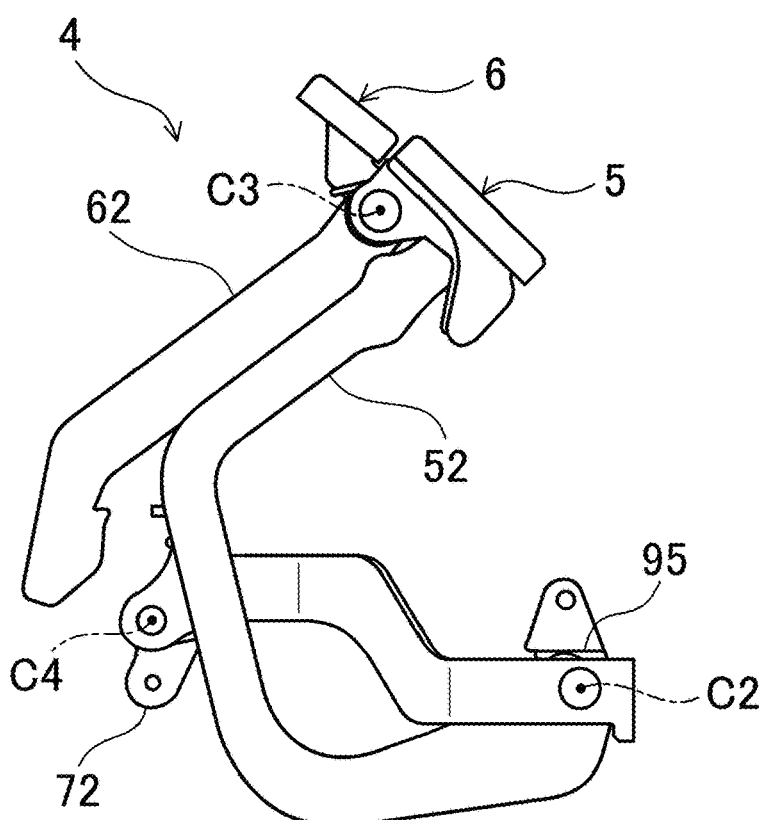
FIG. 12 is a side view of the brake pedal for describing restraint of the brake pedal by the lock.
Figure 13:
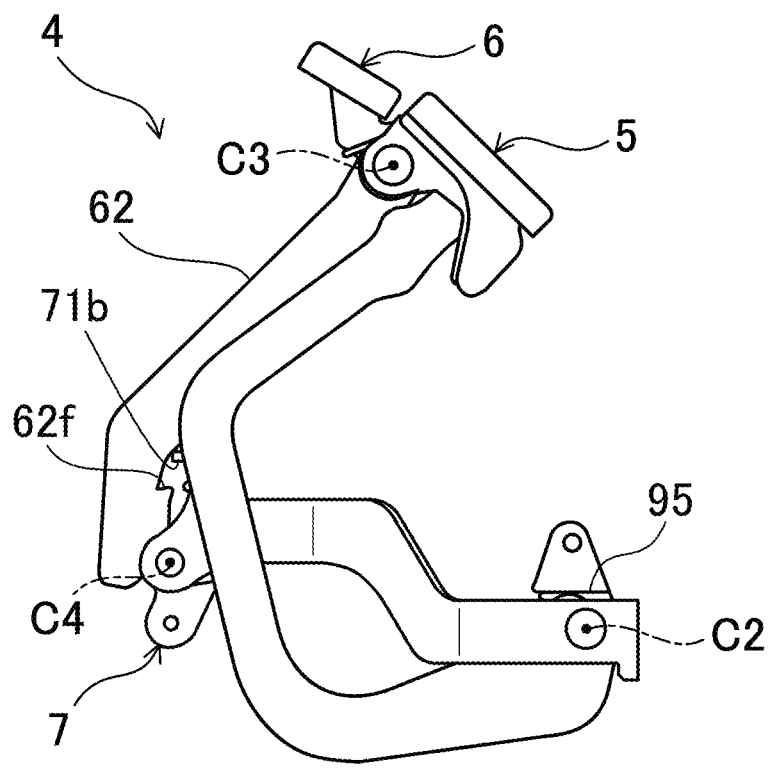
FIG. 13 is a side view of the brake pedal for describing restraint of the brake pedal by the lock.
Figure 14:
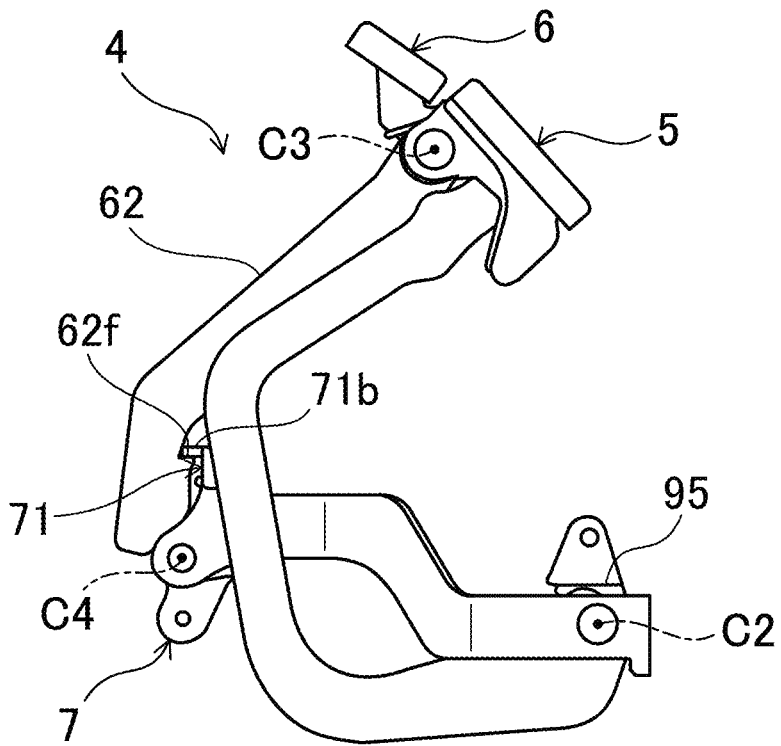
FIG. 14 is a side view of the brake pedal for describing restraint of the brake pedal by the lock.

Next, restraint of the brake pedal 4 by the lock 7 will be described. FIGS. 11, 12, 13, and 14 are side views of the brake pedal 4 for describing restraint of the brake pedal 4 by the lock 7. Specifically, FIG. 11 is a side view of the brake pedal 4 at the second initial position. FIG. 12 is a side view of the brake pedal 4 at the maximum rotation position. FIG. 13 is a side view of the brake pedal 4 at the maximum rotation position while the parking brake pedal 6 is depressed. FIG. 14 is a side view of the brake pedal 4 at the parking position and restrained by the lock 7.

First, the driver depresses the brake pedal 4, specifically the normal brake pedal 5, at the second initial position shown in FIG. 11. Accordingly, the normal brake pedal 5 rotates from the second initial position about the second rotation axis C2. This causes the cable 94 (see FIG. 6) attached to the normal brake pedal 5 moves forward, and the vehicle 100 is braked. At this time, the parking brake pedal 6 rotates together with the normal brake pedal 5.

In the case of parking the vehicle 100, as illustrated in FIG. 12, the driver depresses the normal brake pedal 5 to stop the vehicle 100 completely. Thereafter, as illustrated in FIG. 13, the driver depresses the parking brake pedal 6 forward in a state where the normal brake pedal 5 is kept at a rotation position between the parking position and the maximum rotation position or at the maximum rotation position. Accordingly, the parking brake pedal 6 rotates about the third rotation axis C3. The hook 62*f* moves to a position immediately under the projection piece 71*b* of the striker 71. Subsequently, when the driver releases depression of the parking brake pedal 6, the normal brake pedal 5 rotates toward the second initial position by biasing of the first spring 95. Accordingly, as illustrated in FIG. 14, the hook 62*f* of the parking brake pedal 6 is engaged with the projection piece 71*b* of the striker 71, and the brake pedal 4 is fixed at the parking position. In this manner, the brake pedal 4 restrained by the lock 7.

Figure 15:
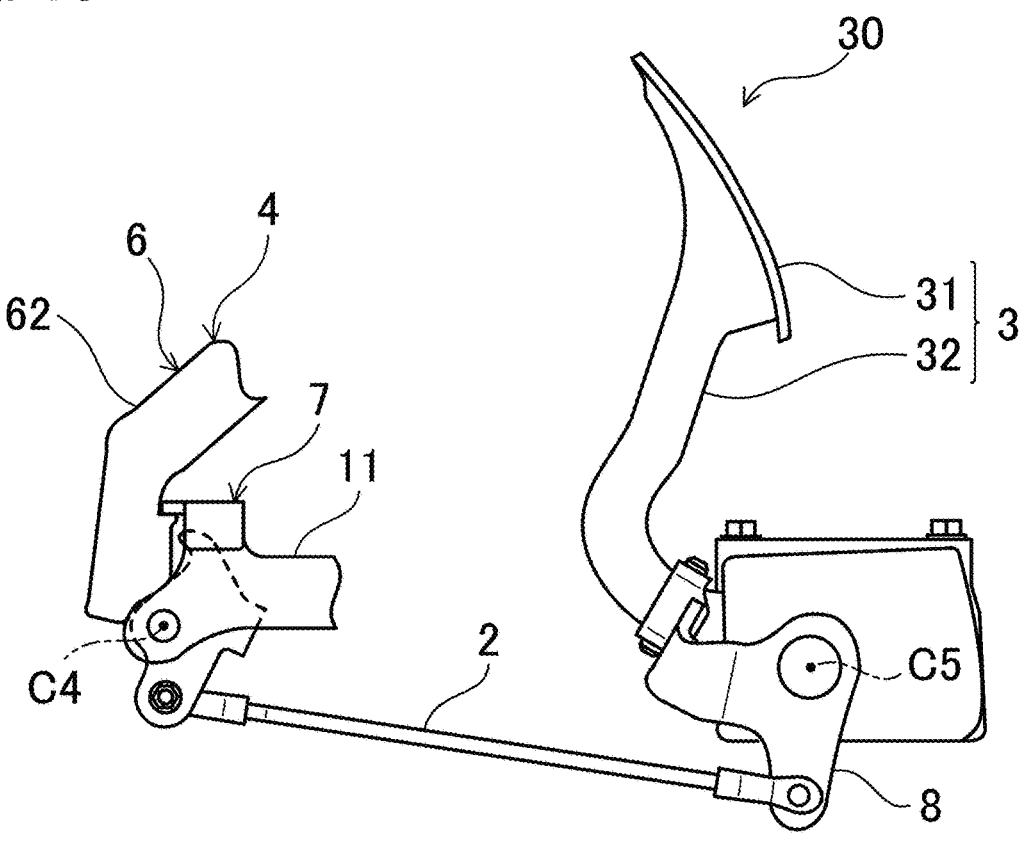
FIG. 15 is a side view illustrating a portion of a parking brake pedal, the accelerator pedal assembly, the lock, the link, and the rotation lever for describing release of restraint of the brake pedal by the lock.
Figure 16:
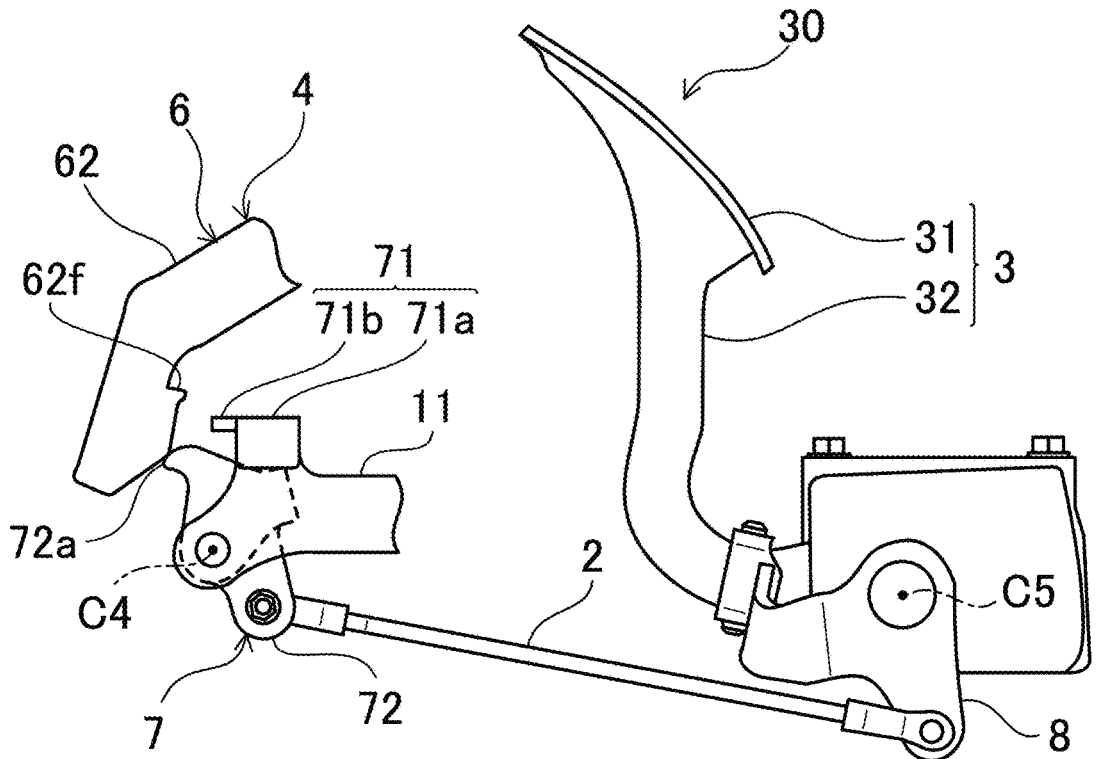
FIG. 16 is a side view illustrating a portion of a parking brake pedal, an accelerator pedal assembly, a lock, a link, and a rotation lever for describing release of restraint of the brake pedal by the lock.
Figure 17:
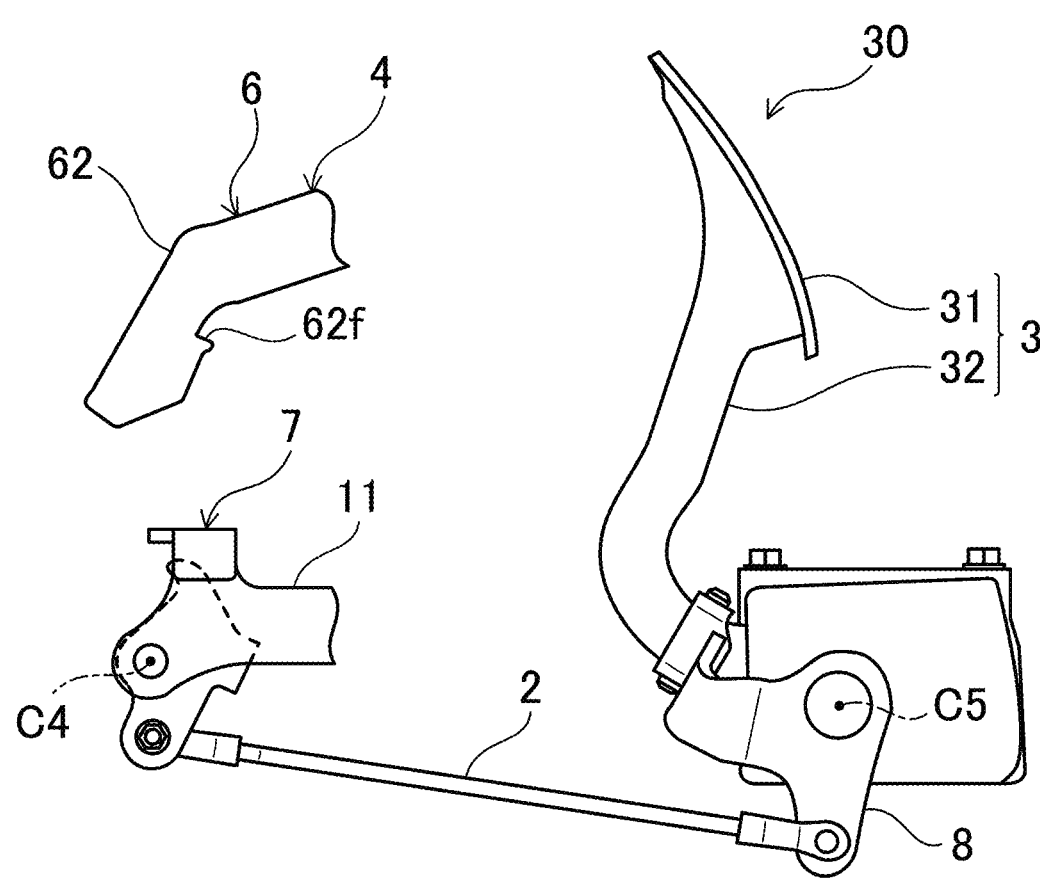
FIG. 17 is a side view illustrating a portion of the parking brake pedal, the accelerator pedal assembly, the lock, the link, and the rotation lever for describing release of restraint of the brake pedal by the lock.

Release of restraint of the brake pedal 4 by the lock 7 will now be described. FIGS. 15, 16, and 17 are side views of a portion of the parking brake pedal 6, the accelerator pedal assembly 30, the lock 7, the link 2, and the rotation lever 8 for describing release of restraint of the brake pedal 4 by the lock 7. Specifically, FIG. 15 shows a state where the parking brake pedal 6 and the lock 7 are engaged with each other. FIG. 15 shows the accelerator pedal 3 at the first initial position. The state shown in FIG. 15 is the same as the state shown in FIG. 14 described above. FIG. 16 shows a state where engagement between the parking brake pedal 6 and the lock 7 is released. FIG. 17 shows a state after engagement between the parking brake pedal 6 and the lock 7 is released.

First, in the state illustrated in FIG. 15, the driver depresses the accelerator pedal 3 at the first initial position. Accordingly, as illustrated in FIG. 16, the accelerator pedal 3 rotates about the first rotation axis C1 (see FIG. 4). In conjunction with rotation of the accelerator pedal 3, the rotation lever 8 rotates counterclockwise when seen from the left about the fifth rotation axis C5. In conjunction with rotation of the rotation lever 8, the link 2 moves rearward. In conjunction with movement of the link 2, the release lever 72 rotates counterclockwise when seen from the left about the fourth rotation axis C4. Accordingly, the first portion 72*a* of the release lever 72 pushes the arm 62 of the parking brake pedal 6 forward. When the accelerator pedal 3 rotates to the unlocked position, engagement between the hook 62*f* of the arm 62 and the projection piece 71*b* of the striker 71 is released. Accordingly, restraint of the brake pedal 4 at the parking position is released. In the manner described above, the lock 7 releases restraint of the brake pedal 4 at the parking position in conjunction with rotation of the accelerator pedal 3 from the first initial position by the link 2. Subsequently, as illustrated in FIG. 11, the normal brake pedal 5 rotates about the second rotation axis C2 and returns to the second initial position by biasing of the first spring 95. The biasing of the second spring 96 causes the parking brake pedal 6 to rotate about the third rotation axis C3 and return to the third initial position.

Thereafter, when the driver releases the foot from the accelerator pedal 3, as illustrated in FIG. 17, biasing of the biasing member housed in the housing 33 causes the accelerator pedal 3 to rotate about the first rotation axis C1 and return to the first initial position. In conjunction with rotation of the accelerator pedal 3, the rotation lever 8 rotates clockwise when seen from the left about the fifth rotation axis C5. In conjunction with rotation of the rotation lever 8, the link 2 moves forward. In conjunction with the movement of the link 2, the release lever 72 rotates clockwise when seen from the left about the fourth rotation axis C4.

In the vehicle 100 as described above, a load substantially in the front-rear directions is input from the accelerator pedal 3 to the link 2 by depression of the accelerator pedal 3 by the driver. The link 2 extends from the left of the accelerator pedal 3 toward the lock 7, and moves forward and outward in accordance with rotation of the accelerator pedal 3. A component in the front-rear directions of the load transferred from the accelerator pedal 3 to the link 2 can be increased. That is, in the load transferred from the accelerator pedal 3 to the link 2, a load dispersed in directions other than the front-rear directions, that is, a load dispersed in directions such as the vehicle width directions can be reduced. As a result, the load transferred from the accelerator pedal to the link 2 can be efficiently transferred to the lock 7, that is, to the brake pedal 4.

Especially in this example, since the link 2 extends linearly, a load transferred from the accelerator pedal 3 to the link 2 is more efficiently transferred to the lock 7. In addition, in this example, the link 2 is coupled to each of the accelerator pedal 3 and the lock 7 through the ball joint. Accordingly, in a coupling portion of the link 2 to each of the accelerator pedal 3 and the lock 7, a transfer loss of a load from the accelerator pedal 3 can be reduced.

The link 2 is located between the accelerator pedal 3 and the brake pedal 4 with respect to the vehicle width directions. Accordingly, the link 2 can be easily extended in the front-rear directions. Consequently, a component in the front-rear directions of the load transferred from the accelerator pedal 3 to the link 2 can be further increased.

The rotation lever 8 is coupled to the accelerator pedal 3 to be movable relative to the accelerator pedal 3. Accordingly, even in a case where the fifth rotation axis C5 that is the rotation axis of the rotation lever 8 is shifted from the first rotation axis C1 that is the rotation axis of the accelerator pedal 3, the rotation lever 8 can be smoothly rotated in conjunction with rotation of the accelerator pedal 3. If the rotation lever 8 is fixed to the accelerator pedal 3, in a case where the fifth rotation axis C5 is shifted from the first rotation axis C1, even when the accelerator pedal 3 rotates, the rotation lever 8 might have difficulty in rotation in conjunction with rotation of the accelerator pedal 3

The attachment position of the link 2 to the rotation lever 8 is lower than the attachment position of the link 2 to the lock 7. Accordingly, as compared to a case where the attachment position of the link 2 to the rotation lever 8 is at the same height as the attachment position of the link 2 to the lock 7, the amount of movement of the first joint 21 and the second joint 22 when the accelerator pedal 3 rotates, can be increased. As a result, the rotation angle of the release lever 72 is also increased, thus further ensuring release of restraint of the brake pedal 4 by the lock 7.

Other Embodiments

In the foregoing section, the embodiment has been described as an example of the technique disclosed in the present application. The technique disclosed here, however, is not limited to this embodiment, and is applicable to other embodiments obtained by changes, replacements, additions, and/or omissions as necessary. Components described in the above embodiment may be combined as a new exemplary embodiment. Components provided in the accompanying drawings and the detailed description can include components unnecessary for solving problems as well as components necessary for solving problems in order to exemplify the technique. Therefore, it should not be concluded that such unnecessary components are necessary only because these unnecessary components are included in the accompanying drawings or the detailed description.

The vehicle 100 may be a single-passenger vehicle. The vehicle 100 may be a vehicle with a single row of seats or a vehicle with three rows of seats. The vehicle 100 may also be a three-wheeled vehicle having three wheels, or may be a six-wheeled vehicle having six wheels.

The vehicle of the present disclosure may be an off-road vehicle or an on-road vehicle. The off-road vehicle may be, for example, an all terrain vehicle (ATV), a tractor, or other vehicles.

The shape, arrangement, and other features of the accelerator pedal 3 are not limited to those of the configuration described above. The attachment structure of the accelerator pedal 3 to the body frame 11 is not limited to the structure described above. For example, the accelerator pedal 3 may be directly attached to the body frame 11 to be rotatable about the predetermined rotation axis. The shape, arrangement, and other features of the brake pedal 4 are not limited to those of the configuration described above.

The shape, arrangement, and other features of the brake pedal 4 are not limited to those of the configuration described above. For example, the parking brake pedal 6 may be located at the left of the normal brake pedal 5. In this case, the parking brake pedal 6 is preferably coupled to the normal brake pedal 5 and rotates in conjunction with rotation of the normal brake pedal 5. For example, the parking brake pedal 6 may not be coupled to the normal brake pedal 5 and may not rotate in conjunction with rotation of the normal brake pedal 5.

The lock 7 is not limited to the configuration described above as long as the lock 7 restraints the brake pedal 4 in a state where the brake pedal 4 is rotated to the parking position and releases restraint of the brake pedal 4 at the parking position in conjunction with rotation of the accelerator pedal 3 from the first initial position by the link 2. For example, the release lever 72 of the lock 7 may be a part that does not rotate and simply moves in the front-rear directions in conjunction with movement of the link 2. In this case, when the release lever 72 moves forward with the brake pedal 4 restrained at the parking position, the release lever 72 may push the arm 62 of the parking brake pedal 6 forward to release restraint of the brake pedal 4.

The link 2 does not need to have a rod shape. For example, the link 2 may have a plate shape or may be a cable. The link 2 does not need to extend linearly. For example, the link 2 may be bent or curved to project upward. The link 2 may not be located between the accelerator pedal 3 and the brake pedal 4 with respect to the vehicle width directions. The link 2 may be coupled to each of the accelerator pedal 3 and the lock 7 through a joint other than the ball joint.

The rotation lever 8 may be coupled to the accelerator pedal 3 to be immovable relative to the accelerator pedal 3. In this case, the fifth rotation axis C5 as a rotation axis of the rotation lever 8 preferably coincides with the first rotation axis C1 as a rotation axis of the accelerator pedal 3. Accordingly, the rotation lever 8 can rotate smoothly in conjunction with rotation of the accelerator pedal 3. The rotation lever 8 may not be coupled to the accelerator pedal 3 through the elastic member 93. For example, the rotation lever 8 may be directly coupled to the accelerator pedal 3 to be movable relative to the accelerator pedal 3.

The attachment position of the link 2 to the rotation lever 8 may not be lower than the attachment position of the link 2 to the lock 7. For example, the attachment position of the link 2 to the rotation lever 8 may be substantially the same as the attachment position of the link 2 to the lock 7.

[Aspects]

The embodiment described above are a specific example of the following aspects.

(First Aspect)

A vehicle (utility vehicle 100) includes: an accelerator pedal 3 rotatably supported by a vehicle body 1; a brake pedal 4 located at left of the accelerator pedal 3 and rotatably supported by the vehicle body 1; and a lock 7 that restrains the brake pedal 4 in a state where the brake pedal 4 is rotated to a parking position, wherein the lock 7 is coupled to the accelerator pedal 3 through a link 2, and when the accelerator pedal 3 rotates from an initial position, releases restraint of the brake pedal 4 at the parking position by the link 2 in conjunction with rotation of the accelerator pedal 3, and the link 2 extends from left of the accelerator pedal 3 toward the lock 7 and moves in front-rear directions in accordance with rotation of the accelerator pedal 3.

With depression of the accelerator pedal 3 by the driver, a load substantially in the front-rear directions is input from the accelerator pedal 3 to the link 2. In this configuration, the link 2 extends from the left of the accelerator pedal 3 toward the lock 7 and moves in the front-rear directions in accordance with rotation of the accelerator pedal 3. A component in the front-rear directions of the load transferred from the accelerator pedal 3 to the link 2 can be increased. That is, in the load transferred from the accelerator pedal 3 to the link 2, a load dispersed in directions other than the front-rear directions, that is, a load dispersed in directions such as the vehicle width directions can be reduced. As a result, the load transferred from the accelerator pedal to the link 2 can be efficiently transferred to the lock 7, that is, the brake pedal 4.

(Aspect 2)

In the vehicle of Aspect 1, the brake pedal 3 includes a normal brake pedal 5 that is operated in braking the vehicle, and a parking brake pedal 6 that is operated in setting the vehicle in a parked state, and the parking brake pedal 6 is coupled to the normal brake pedal 5 and rotates in conjunction with rotation of the normal brake pedal 5.

In this configuration, since the parking brake pedal 6 is coupled to the normal brake pedal 5 and rotates in conjunction with rotation of the normal brake pedal 5, when the brake pedal 4 is restrained in the state of being rotated to the parking position, the normal brake pedal 5 is restrained in the state of being rotated to the parking position. That is, the vehicle can be set in the parked state by utilizing a braking force of the normal brake pedal 5.

(Aspect 3)

In the vehicle of Aspect 1 or 2, the link 2 is coupled to each of the accelerator pedal 3 and the lock 7 through a ball joint.

In this configuration, a transfer loss of a load from the accelerator pedal 3 is reduced in a coupling portion of the link 2 to each of the accelerator pedal 3 and the lock 7.

(Aspect 4)

In the vehicle of any one of Aspects 1 to 3, the link 2 is located between the accelerator pedal 3 and the brake pedal 4 with respect to vehicle width directions.

In this configuration, the link 2 can easily extend in the front-rear directions. As a result, a component in the front-rear directions of the load transferred from the accelerator pedal 3 to the link 2 can be further increased.

(Aspect 5)

In the vehicle of any one of Aspects 1 to 4, the link 2 extends linearly.

In this configuration, a load transferred from the accelerator pedal 3 to the link 2 can be more efficiently transferred to the lock 7.

(Aspect 6)

The vehicle of any one of Aspects 1 to 5 further includes a rotation lever 8 that is rotatably supported by the vehicle body 1 and couples the accelerator pedal 3 and the link 2 to each other, wherein the rotation lever 8 is coupled to the accelerator pedal 3 to be movable relative to the accelerator pedal 3.

In this configuration, even in a case where the rotation axis of the rotation lever 8 is shifted from the rotation axis of the accelerator pedal 3, the rotation lever 8 can be rotated smoothly in conjunction with rotation of the accelerator pedal 3. If the rotation lever 8 is fixed to the accelerator pedal 3, in a case where the rotation axis of the rotation lever 8 is shifted from the rotation axis of the accelerator pedal 3, even when the accelerator pedal 3 rotates, the rotation lever 8 might have difficulty in rotation in conjunction with rotation of the accelerator pedal 3.

(Aspect 7)

In the vehicle of any one of Aspects 1 to 6, the rotation lever 8 is coupled to the accelerator pedal 3 through an elastic member.

The configuration can obtain a configuration in which the rotation lever 8 and the accelerator pedal 3 are coupled to each other to be movable relative to each other.

(Aspect 8)

In the vehicle of any one of Aspects 1 to 7, attachment position of the link 2 to the rotation lever 8 is lower than an attachment position of the link 2 to the lock 7.

In this configuration, as compared to a case where the attachment position of the link 2 to the rotation lever 8 is at the same level as the attachment position of the link 2 to the lock 7, the amount of movement of the coupling portion between the rotation lever 8 and the link 2 and the amount of movement of the coupling portion between the link 2 and the lock 7 can be increased in rotation of the accelerator pedal 3. As a result, the amount of movement of the lock 7 increases accordingly, thereby further ensuring unlocking of the lock 7.

(Aspect 9)

A vehicle (utility vehicle 100) includes: an accelerator pedal 3 rotatably supported by a vehicle body 1; a brake pedal 4 located at left of the accelerator pedal 3 and rotatably supported by the vehicle body 1; and a lock 7 that restrains the brake pedal 4 in a state where the brake pedal 4 is rotated to a parking position, wherein the lock 7 is coupled to the accelerator pedal 3 through a link 2, and when the accelerator pedal 3 rotates from an initial position, releases restraint of the brake pedal 4 at the parking position by the link 2 in conjunction with rotation of the accelerator pedal 3, the link 2 includes a first end 2a located at left of the accelerator pedal 3 and a second end 2b attached to the lock 7, and extends from left of the accelerator pedal 3 toward the lock 7, and the second end 2b is located forward of the first end 2a with respect to the front-rear directions.

With depression of the accelerator pedal 3 by the driver, a load substantially in the front-rear directions is input from the accelerator pedal 3 to the link 2. In this configuration, the link 2 extends from the left of the accelerator pedal 3 toward the lock 7. Further, with respect to the front-rear directions, the second end 2b is located forward of the first end 2a. Accordingly, a component in the front-rear directions of the load transferred from the accelerator pedal 3 to the link 2 can be increased. That is, in the load transferred from the accelerator pedal 3 to the link 2, a load dispersed in directions other than the front-rear directions, that is, a load dispersed in directions such as the vehicle width directions can be reduced. As a result, the load transferred from the accelerator pedal to the link 2 can be efficiently transferred to the lock 7, that is, to the brake pedal 4.

(Aspect 10)

A vehicle (e.g., utility vehicle) includes: an accelerator pedal 3 rotatably supported by a vehicle body 1; a brake pedal 4 located at left of the accelerator pedal 3 and rotatably supported by the vehicle body 1; a lock 7 that restrains the brake pedal 4 in a state where the brake pedal 4 is rotated to a parking position; and a rotation lever 8 rotatably supported by the vehicle body 1, wherein the lock 7 is coupled to the accelerator pedal 3 through a link 2, and when the accelerator pedal 3 rotates from an initial position, releases restraint of the brake pedal 4 at the parking position by the link 2 in conjunction with rotation of the accelerator pedal 3, and the rotation lever 8 couples the accelerator pedal 3 and the link 2 to each other, and is coupled to the accelerator pedal 3 to be movable relative to the accelerator pedal 3.

This configuration includes the rotation lever 8 that can rotate smoothly in conjunction with rotation of the accelerator pedal 3. The rotation lever 8 couples the accelerator pedal 3 and the link 2 to each other. This enhances load transfer efficiency from the accelerator pedal 3 to the brake pedal 4.

(Aspect 11)

In the vehicle of Aspect 10, the rotation lever 8 is located at left of the accelerator pedal 3, the link 2 includes a first end 2a attached to the rotation lever 8 and a second end 2b attached to the lock 7, and extends from left of the rotation lever 8 toward the lock 7, and the second end 2b is located forward of the first end 2a with respect to the front-rear directions.

This configuration can increase a component in the front-rear directions of the load transferred from the accelerator pedal 3 to the link 2. That is, in the load transferred from the accelerator pedal 3 to the link 2, a load dispersed in directions other than the front-rear directions, that is, a load dispersed in directions such as the vehicle width directions can be reduced. As a result, the load transferred from the accelerator pedal to the link 2 can be efficiently transferred to the lock 7, that is, to the brake pedal 4.

The invention claimed is:

1. A vehicle comprising:
   an accelerator pedal rotatably supported by a vehicle body;
   a brake pedal located at left of the accelerator pedal and rotatably supported by the vehicle body;
   a lock that restrains the brake pedal in a state where the brake pedal is rotated to a parking position; and
   a rotation lever rotatably supported by the vehicle body, wherein
   the lock is coupled to the accelerator pedal through a link, and when the accelerator pedal rotates from an initial position, releases restraint of the brake pedal at the parking position by the link in conjunction with rotation of the accelerator pedal,
   the rotation lever couples the accelerator pedal and the link to each other, and is coupled to the accelerator pedal to be movable relative to the accelerator pedal,
   the link extends from left of the accelerator pedal toward the lock and moves in front-rear directions in accordance with rotation of the accelerator pedal, and
   a coupling position of the link relative to the lock moves in the front-rear directions.

2. The vehicle according to claim 1, wherein
   the brake pedal includes a normal brake pedal that is operated in braking the vehicle, and a parking brake pedal that is operated in setting the vehicle in a parked state, and
   the parking brake pedal is coupled to the normal brake pedal and rotates in conjunction with rotation of the normal brake pedal.

3. The vehicle according to claim 1, wherein
   the link is coupled to each of the accelerator pedal and the lock through a ball joint.

4. The vehicle according to claim 1, wherein
   the link is located between the accelerator pedal and the brake pedal with respect to vehicle width directions.

5. The vehicle according to claim 1, wherein
   the link extends linearly.

6. The vehicle according to claim 1, wherein
the rotation lever is coupled to the accelerator pedal
through an elastic member.

7. The vehicle according to claim 1, wherein
an attachment position of the link to the rotation lever is
lower than an attachment position of the link to the
lock.

8. A vehicle comprising:
an accelerator pedal rotatably supported by a vehicle
body;
a brake pedal located at left of the accelerator pedal and
rotatably supported by the vehicle body;
a lock that restrains the brake pedal in a state where the
brake pedal is rotated to a parking position; and
a rotation lever rotatably supported by the vehicle body,
wherein
the lock is coupled to the accelerator pedal through a link,
and when the accelerator pedal rotates from an initial
position, releases restraint of the brake pedal at the
parking position by the link in conjunction with rota-
tion of the accelerator pedal,
the rotation lever couples the accelerator pedal and the
link to each other, and is coupled to the accelerator
pedal to be movable relative to the accelerator pedal,
the link includes a first end located at left of the accel-
erator pedal and attached to the rotation lever and a
second end attached to the lock, and extends from left
of the accelerator pedal toward the lock, the second end is located forward of the first end with
respect to the front-rear directions, and
the first end and the second end move in the front-rear
directions in response to the rotation of the accelerator
pedal.

9. A vehicle comprising:
an accelerator pedal rotatably supported by a vehicle
body;
a brake pedal located at left of the accelerator pedal and
rotatably supported by the vehicle body;
a lock that restrains the brake pedal in a state where the
brake pedal is rotated to a parking position; and
a rotation lever rotatably supported by the vehicle body,
wherein
the lock is coupled to the accelerator pedal through a link,
and when the accelerator pedal rotates from an initial
position, releases restraint of the brake pedal at the
parking position by the link in conjunction with rota-
tion of the accelerator pedal,
the rotation lever couples the accelerator pedal and the
link to each other, and is coupled to the accelerator
pedal to be movable relative to the accelerator pedal,
the rotation lever is located at left of the accelerator pedal,
the link includes a first end attached to the rotation lever
and a second end attached to the lock, and extends from
left of the rotation lever toward the lock, and
the second end is located forward of the first end with
respect to the front-rear directions.

\* \* \* \* \*